Feb. 27, 1968 — W. T. MATZEN — 3,371,153
COLOR DISPLAY SYSTEM UTILIZING RED AND CYAN LIGHT
Filed April 30, 1965 — 2 Sheets-Sheet 1
FIG.1.
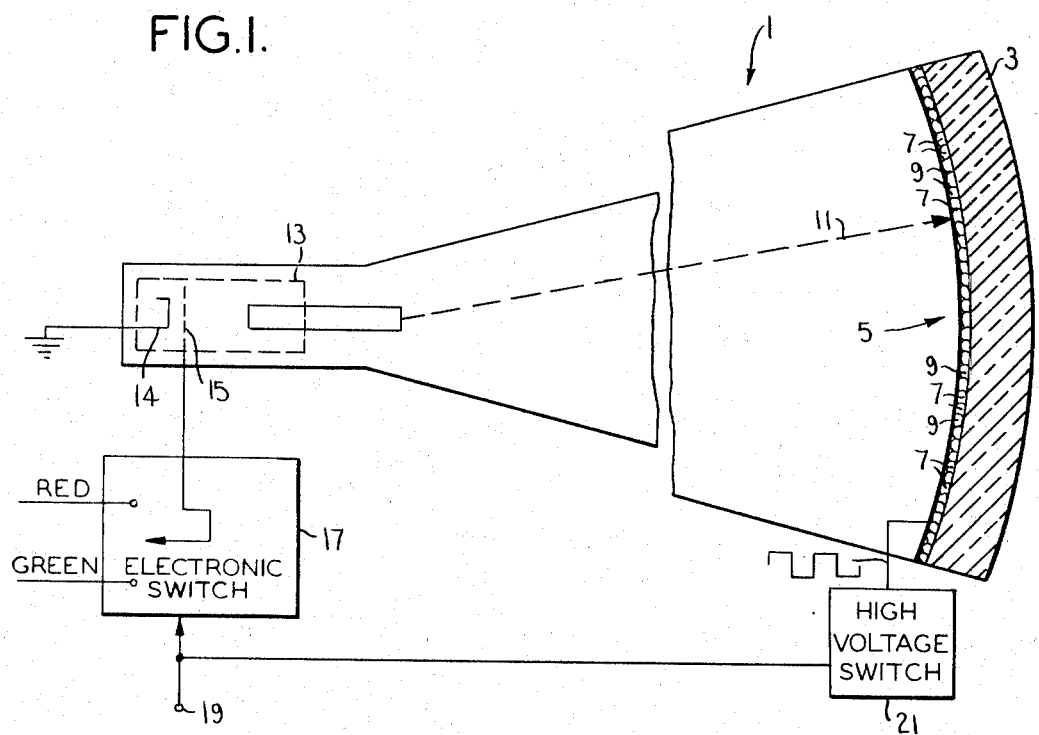
FIG.2.
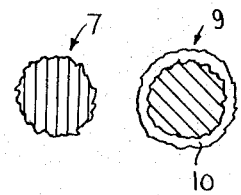
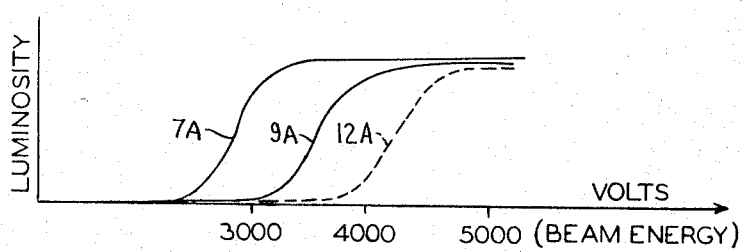
FIG.3.
WALTER T. MATZEN,
INVENTOR
BY John D. Graham
ATTORNEY Feb. 27, 1968  W. T. MATZEN  3,371,153
COLOR DISPLAY SYSTEM UTILIZING RED AND CYAN LIGHT
Filed April 30, 1965  2 Sheets-Sheet 2 though a page-scale

United States Patent Office 3,371,153
Patented Feb. 27, 1968

3,371,153
COLOR DISPLAY SYSTEM UTILIZING RED AND CYAN LIGHT
Walter T. Matzen, Richardson, Tex., assignor to Texas Instruments Incorporated, Dallas, Tex., a corporation of Delaware
Filed Apr. 30, 1965, Ser. No. 452,299
3 Claims. (Cl. 178—5.4)

This invention relates to a color display system, and more particularly to a color display system viewing screen utilizing colored phosphors having different beam energy thresholds.

Among the several objects of this invention may be noted the provision of a color display system in which color separation and image color are controlled by varying the energy level or velocity of an electron beam; the provision of such a system in which the viewing screen may be constituted by a single thin layer of phosphor particles of different light emitting characteristics; the provision of a color display system of the class described in which different color phosphor particles may be activated cumulatively to emit light of different colors by varying the electron beam energy level; and the provision of a color display system which is relatively simple, inexpensive and reliable. Other objects and features will be in part apparent and in part pointed out hereinafter.

In brief, this invention is directed to a color display system for producing colored images from first and second color information signals or records such as are transmitted and received in the operation of any of the conventional color television systems, e.g., NTSC, SECAM and PAL. The viewing screen comprises particles of a first phosphor which emit light of a first color when these particles are excited by a beam of electrons having a velocity of at least a first predetermined value. The viewing screen also includes particles of a second phosphor each of which has a surface layer which constitutes a partial barrier to electrons whereby the second phosphor particles have a higher electron energization threshold than that of the first phosphor particles. The second phosphor particles emit a second color light substantially complementary to the first color when excited by a beam of electrons having a velocity of at least a second and greater predetermined value. The first phosphor particles are energized to emit light of the first color and to produce an image in the first color corresponding to said first record by means (such as an electron gun of a kinescope tube) for generating a first beam of electrons with a velocity of the first predetermined value and an intensity which is modulated in accordance with a first signal which constitutes the first record. Both the first and second phosphor particles are energized to emit substantially achromatic light and to produce an image in substantially achromatic light corresponding to the second record by a second beam of electrons having a velocity of the second predetermined value and an intensity which is modulated in accordance with a second signal which constitutes the second record.

The invention accordingly comprises the constructions hereinafter described, the scope of the invention being indicated in the following claims.

In the accompanying drawings, in which one of various possible embodiments of the invention is illustrated, FIGURE 1 schematically illustrates an electronic display tube of a color display system of the present invention;

FIGURE 2 is an enlarged schematic representation of light emitting phosphor particles;

FIGURE 3 is a graph illustrating the response of two different types of color light emitting phosphor particles to electron beams of differing energy levels or velocities;

Corresponding reference characters indicate corresponding parts throughout the several views of the drawings.

Figure 4:
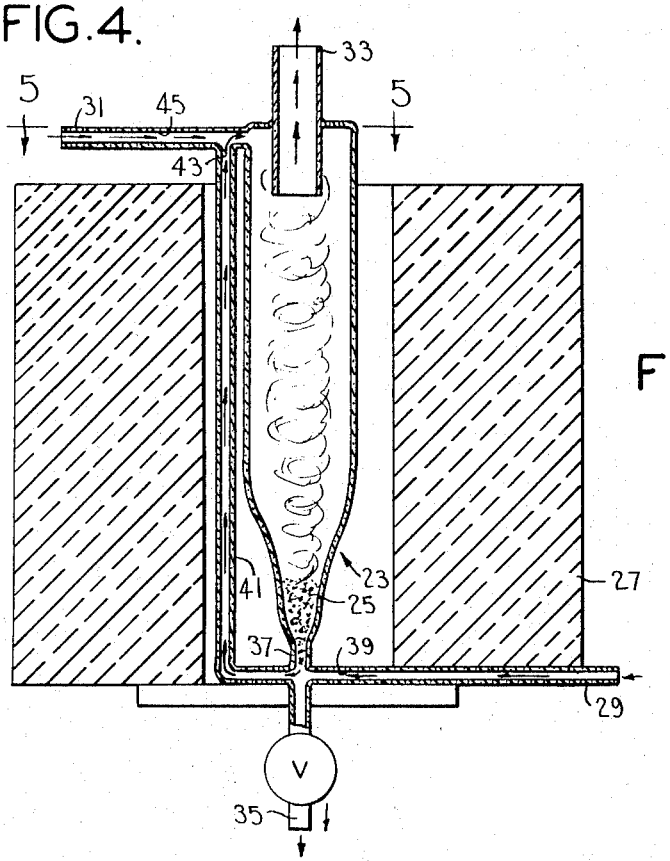
FIGURE 4 illustrates apparatus for forming phosphor particles with increased beam energy thresholds.

Referring now more particularly to FIGURE 1, an electron display tube of a color display system, such as the kinescope of a color television receiver, is indicated at reference numeral 1. The viewing screen includes a transparent glass face plate 3 on which is located a layer 5 of randomly dispersed phosphor particles 7 and 9. Phosphor particles 7 are any conventional red light emitting phosphor, such as ZnS (20%), CdS (80%), (Ag activated). Particles 9 are any conventional cyan light emitting phosphor, such as $ZnSiO_4$ (Mn activated), provided with a surface barrier layer 10 that increases the electron energization threshold of the particles, as will be discussed hereinafter.

Layer 5 is quite thin, being approximately one particle thick, and the particles 7 and 9 are quite closely packed so as to be directly subjected sequentially in small domains to a narrow electron scanning stream or beam 11. Each domain includes some of the phosphor particles 7 and 9 which may be economically applied to the interior of face plate 3 by flushing on the glass a thin liquid slurry of a homogeneous or random mixture of the particles 7 and 9 suspended in a suitable vehicle, followed by pouring off any excess and evaporation to form the thin dry layer 5 of phosphor particles ranging in size from about 3–10 microns in diameter.

The screen 5 includes a thin conductive film over the particles 7, 9; with this film (not shown) ordinarily being composed of aluminum which is deposited by evaporation after the particles have been applied. It is to this aluminum film that the accelerating voltage is applied.

Tube 1 includes an electron gun 13 for generating the stream 11 of electrons which is moved in a raster scanning pattern across screen 5 by any conventional deflection means and circuitry (not shown). Gun 13 includes a cathode 14 and a grid 15 for modulating the beam current or number of electrons in streams 11. By means of an electronic switch 17, the beam current is modulated alternately during sequential time intervals by electronic signals which represent the red and green records respectively, i.e., the red and green color information signals derived in conventional color television receivers. The switching from one color signal to the other may be done on a sequential frame, dot or field basis by a signal applied at terminal 19. A high voltage switch 21 is provided to synchronously switch the high voltage supply so that while the beam current of 11 is being modulated in accordance with the red signal a first accelerating voltage (e.g., 6 kv.) is applied between the viewing screen 5 and cathode 14; and while the beam current is being modulated in accordance with the green signal the accelerating voltage is increased to a higher level (e.g., 7 kv.). Since the sequential electron beams which constitute stream 11 have different electron velocities or beam energy levels, deflection compensation is provided by any suitable conventional means so that the different velocity electron beams are maintained in registry throughout the raster scanning pattern.

The response of the phosphors as seen in FIGURE 3 represents typical data for particles without the presence of the conducting aluminum film. The presence of the aluminum film would merely shift all the curves to the right by about 3 kv.

A typical response of particles 7 and 9 to excitation by electrons having different energies or velocities is illustrated by the curves 7A and 9A in FIGURE 3. Thus it will be seen that phosphor particles 7 will emit red light when the velocity of the electrons is approximately 3 kv. Particles 9 will not be significantly excited by such an electron beam because of the electron barrier effect of layer 10. Phosphor particles 9 will emit cyan light, the complement of red light, at approximately a beam energy level of 4 kv. As the red phosphor particles continue to be energized at a beam energy of 4 kv., a white or substantially achromatic light is emitted at this higher beam energy level. Therefore red and white images (corresponding respectively to the red and green records in the conventional color television systems) are alternately produced on screen 5 and combine to form a composite image which subjectively appears to include a full range of hues, including those which are not actually present in a colorimetric sense. This two-color system of presenting full color images is known in the art and provides images of pleasing appearance in which the hues appear more saturated than would be expected.

Particles 7 and 9 are made differently responsive to electrons of differing energies or velocities by providing particles 9 with surface barrier layer 10. This barrier layer limits entry of electrons into phosphor particles 9 to those electrons having kinetic energies greater than a predetermined level. Other things being equal, the beam current or number of electrons entering a particle determines the amount of light emitted by the particle, i.e., the brightness or value or luminance of the emitted light.

Figure 5:
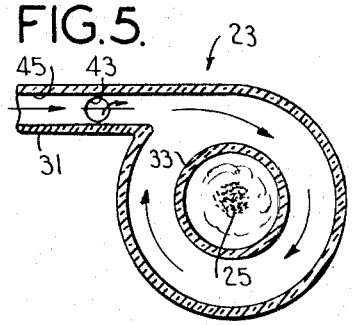
FIGURE 5 is a cross-sectional view on line 5—5 of FIGURE 4.

The surface barrier layer 10 may be a surface film or coating applied in any desired thickness, thereby effecting a correspondingly different electron breakthrough or threshold. Such a barrier layer 10 is provided by a film of silicon dioxide applied preferably in vapor phase utilizing apparatus such as illustrated in FIGURES 4 and 5. This apparatus includes a reactor or chamber 23, preferably of quartz, in which a charge 25 of phosphor particles approximately 3–10 microns in size is introduced. Reactor 23 is enclosed in an insulated heated furnace housing 27 which includes a first gas inlet 29, a second gas inlet 31, a gas outlet 33 and a product discharge vent 35.

Charge 25 of a cyan light emitting phosphor $ZnSiO_4$ (Mn activated) is placed in reactor 23 and oxygen at the rate of 5 l./min. is introduced at inlet 29. By the venturi or aspiration action as the oxygen gas stream passes a junction 37 of the lower restricted outlet of reactor 23 and a conduit 39, phosphor particles will be entrained in the gas stream and pass upwardly through a supply tube 41 to a T junction 43 with another conduit 45 connected to inlet 31. A gaseous mixture of oxygen and tetraethoxysilane is formed by bubbling oxygen through a body of the liquid silane and thereby entraining it in the gas stream. Five l./min. of this oxygen-tetraethoxysilane mixture is introduced into inlet 31 and intermixes with the phosphor-particle-carrying oxygen gas stram, the gas-phosphor mixture being discharged substantially tangentially into the upper portion of reactor 23. The phosphor particles swirl in a spiral path downwardly through the reactor, heated to a temperature of about 500° C., under which conditions a thin film of polycrystalline silicon dioxide is formed on the surface of each phosphor particle. After fifteen minutes of recycling the phosphor particles, they are removed from vent 35.

Figure 6:
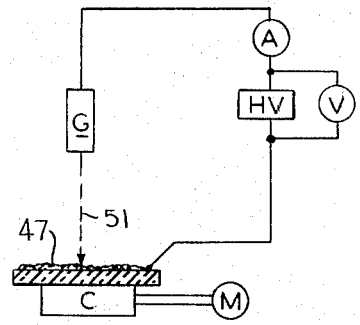
FIGURE 6 is a schematic illustration of apparatus utilized in evaluating and determining electron energization thresholds of phosphors.

FIGURE 6 diagrammatically illustrates apparatus for determining and evaluating the silicon dioxide barrier layer 10 thus formed. A thin layer 47 of coated phosphor particles is deposited on a glass slide 49 by any of the customary procedures. Such a procedure, for example, is the suspending of the phosphor particles in potassium silicate and pouring the suspension in water containing barium acetate. The phosphor particles will settle on a submerged glass slide and silicic acid (formed by the reaction of potassium silicate and barium acetate) will cause the particles to adhere to the glass slide. After evaporation by baking the slide at 400° (thereby forming amorphous silica which bonds the treated phosphor particles to the slide), it is exposed to an electron beam 51 generated by an electron gun G. A high voltage supply HV is connected between the phosphor layer-glass plate and the cathode of gun G to provide an electron accelerating voltage of variable magnitude measured by voltmeter V at a beam current indicated by ammeter A. The brightness of the light emitted by the phosphor being tested is measured in foot candles by a photocell C and a meter M.

Figure 7:
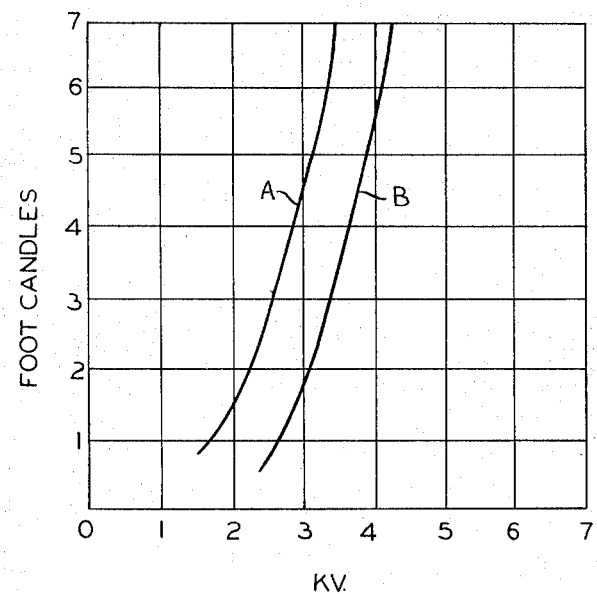
FIGURE 7 is a graphical representation illustrating the increased beam energy threshold value of colored phosphor particles used in the practice of this invention.

An untreated sample of cyan phosphor was tested in the apparatus of FIGURE 6 and, at a beam current of 10 microamperes, the response of this phosphor for various beam accelerating voltages was plotted as indicated by curve A in FIGURE 7. Under the same conditions a sample of cyan phosphor particles having a barrier layer 10 of silicon dioxide (formed as described above) was similarly tested and the response curve is shown at B in FIGURE 7. As indicated by a comparison of curves A and B, barrier layer 10 retards electron penetration or increases the energization threshold so that the electron beam velocity for the same luminosity or brightness must be increased by approximately 1000 v.

Such barrier layers on phosphor particles may also be formed by coating the particles with a film of $Al_2O_3$. It is preferable in certain applications to provide very thin surface barrier layers that effect a very high threshold increase and for this purpose layers including higher atomic number elements and compounds thereof are particularly useful. For example, composite layers of silicon dioxide and tin oxide, or layers of tin oxide alone, or layers of silicon dioxide combined with phosphorus, arsenic, lead, or gallium, or compounds thereof, constitute excellent surface barrier layers that are very thin and have this property of providing a high threshold value. Moreover, it is frequently desirable that the conductivity of these particles with surface barrier layers be increased to insure sufficiently rapid electrostatic discharge and many of such coatings above described, such as those with tin oxide containing barrier layers, provide this enhanced conductivity.

These phosphor particle barrier layers may also be provided by selective out-diffusion or in-diffusion of the impurities or activators. For example, phosphor particles (e.g., activated zinc tungstate, zinc silicate, zinc phosphate or calcium phosphate, etc.) treated at elevated temperatures in an atmosphere of vapor phase sulfur, oxygen, selenium, tellurium, etc. will undergo a chemical alteration of the surface layer of the phosphors to reduce the concentration of the activator at the surface of the particle, or will have formed thereon a surface layer of oxide, sulfide, etc.

More detailed descriptions of forming such surface barrier layers on phosphor particles may be found in the copending and coassigned application Ser. No. 459,582, filed May 25, 1965.

It will be understood that the present invention encompasses a three-color phosphor system as well as the two-color phosphor system specifically described herein. Thus a third color phosphor, such as blue, having a surface barrier layer of higher threshold characteristics than that of the cyan light emitting phosphor particles 9 (e.g., which will emit blue light when struck by electrons of at least a third predetermined energy level, such as 5000 v.) may be incorporated in the viewing screen of the color display system. Such blue phosphor particles preferably have a response curve as illustrated by the dashed line curve 12A in FIGURE 3. A low accelerating voltage will energize only the red phosphor while an intermediate voltage will energize both the red and the cyan phosphors thereby to produce a warm acromatic light substantially as in the two-phospor kinescope illustrated in FIGURE 1. At high accelerating voltages, however, all three phosphors are energized thereby producing a light which is relatively cool, though also substantially achromatic or unsaturated. By providing electron beams at the three energy levels and modulating each beam in accordance with the red, green and blue color information signals derived in conventional color television receivers, images in red, warm achromatic and cool achromatic light respectively are produced. These three different velocity electron beams may be generated by one, two or three guns, each beam having a current respectively modulated in accordance with the red, green and blue information signals, as is also familiar to those skilled in this art.

It will also be noted that the phosphor particles may be applied in discrete thin layers, each of which is constituted by particles of a single color phosphor. Also, if desired both or all three types of phosphor particles may have surface barriers differing in thickness or chemical or physical characteristics.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a color display system for producing colored images from first and second records:

a viewing screen comprising particles of a first phosphor which emit light of a first color when excited by a beam of electrons having a velocity of at least a first predetermined value, and particles of a second phosphor each having a surface layer which constitutes a partial barrier to electrons whereby the second phosphor particles have a higher electron energization threshold than that of said first phosphor particles, said second phosphor particles emitting a second color light substantially complementary to said first color when excited by a beam of electrons having a velocity of at least a second predetermined value which is greater than said first value, means for generating a first beam of electrons having a velocity of said first predetermined value and an intensity modulated in accordance with said first record thereby to cause said first phosphor particles to emit light of said first color and produce an image in said first color corresponding to said first record, and means for generating a second beam of electrons having a velocity of said second predetermined value and an intensity modulated in accordance with said second record thereby to cause both said first and second phosphor particles to emit substantially achromatic light and produce an image in substantially achromatic light corresponding to said second record.

2. In a color display system as set forth in claim 1, said first phosphor particles emitting substantially red light when energized, and said second phosphor particles emitting substantially cyan light when energized.

3. In a color display system as set forth in claim 2, said screen comprising a thin continuous layer of a random mixture of the two phosphor particles.

References Cited

UNITED STATES PATENTS

| | | | |
|---|---|---|---|
| 2,543,477 | 2/1951 | Sziklai et al. | 313—92 X |
| 2,915,661 | 12/1959 | Lederer | 319—92 X |
| 3,204,143 | 8/1965 | Pritchard | 178—5.4 |
| 3,242,260 | 3/1966 | Cooper et al. | 178—5.4 |
| 3,290,434 | 12/1966 | Cooper et al. | 178—5.4 |

ROBERT L. GRIFFIN, *Primary Examiner.*

DAVID G. REDINBAUGH, JOHN W. CALDWELL, *Examiners.*

J. A. O'BRIEN, R. MURRAY, *Assistant Examiners.*